United States Patent Office 3,452,124
Patented June 24, 1969

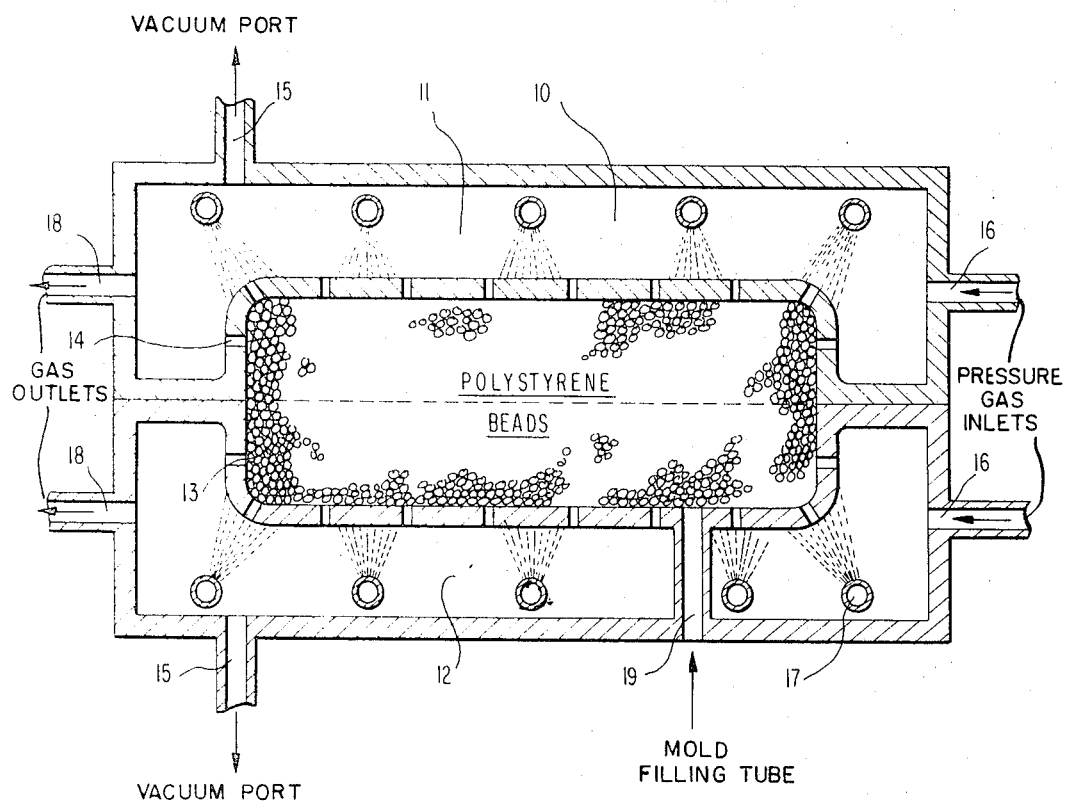

3,452,124
REDUCTION OF COOLING CYCLES THROUGH RAPID DECOMPRESSION OF HEATED BEADS
Eugene J. Knapp, Corning, N.Y., assignor to Corning Glass Works Inc., Corning, N.Y., a corporation of New York
Filed Aug. 27, 1964, Ser. No. 392,385
Int. Cl. B29d 27/00
U.S. Cl. 264—53
1 Claim

ABSTRACT OF THE DISCLOSURE

A method of molding articles comprising introducing resin beads containing a blowing agent into a mold, heating the bead-filled mold to the fusion temperature of the resin while maintaining the beads under a pressure sufficient to prevent expansion thereof and suddenly releasing the pressure to cause expansion and cooling of the beads to produce a cellular shaped article.

---

This invention relates to the formation of molded cellular shaped articles and more particularly to a method for molding cellular shaped articles from thermoplastic synthetic resinous beads. Still more particularly, this invention provides a method for making cellular shaped articles in which the cooling step is materially reduced or entirely eliminated and the time cycle required for molding is shortened.

In the molding of cellular articles from thermoplastic beads, it is generally necessary to introduce sufficient heat into the mold to raise the thermoplastic material to its fusion temperature. Prior to removing the finished article from the mold, it is necessary to dissipate this heat. In the prior art methods, this heat was removed through elaborate and lengthy cooling cycles. Therefore, considerable attention has been directed to the improvement of such processes to minimize or eliminate the cooling cycle, thereby greatly reducing the time and expense of processes for forming molded cellular articles.

Accordingly, it is the object of this invention to provide a method for molding cellular articles in which the cooling step is materially reduced or entirely eliminated.

More particularly, it is the object of this invention to provide a method for molding cellular shaped articles from thermoplastic resinous beads by heating the beads in a manner which permits rapid cooling of the beads and thus materially reduces any cooling cycle which might be required.

Still more particularly, it is the object of this invention to provide a method for molding cellular articles which comprises heating a mold, filled with thermoplastic beads containing a blowing agent, to a temperature of at least the fusion temperature of the thermoplastic resin while maintaining the beads under a gas pressure sufficient to prevent expansion of the beads and suddenly and substantially instantaneously releasing the pressure to thereby cause expansion and cooling of the beads and produce a cellular shaped article.

Additionally, it is the object of this invention to provide a method for molding cellular articles which comprises heating thermoplastic beads containing a blowing agent to a temperature higher than the vaporization temperature of the blowing agent and lower than the fusion temperature of the thermoplastic resin, introducing the hot beads into a mold, heating the bead-filled mold to a temperature of at least the fusion temperature of the thermoplastic resin while maintaining the beads under a gas pressure sufficient to prevent expansion of the beads and suddenly and substantially instantaneously releasing the pressure to thereby cause expansion and cooling of the beads and produce a cellular shaped article.

In a preferred embodiment of this invention, the thermoplastic beads are preheated to a temperature higher than the vaporization temperature of the blowing agent and lower than the fusion temperature of the thermoplastic resin. The temperature to which the beads are preheated depends upon the particular thermoplastic resin and blowing agent employed. Thus, it is found that when polystyrene beads are used, a temperature in the range of from 28° to 65° C. is suitable. This method of preheating the beads is more fully described in my co-pending application, Ser. No. 392,525 filed Aug. 27, 1964.

The beads are then introduced into a mold. The bead-filled mold is heated under a controlled pressure which prevents further expansion of the individual beads. The bead-filled mold is heated to a temperature at least as high as the fusion temperature of the thermoplastic resin employed. If desired, the bead-filled mold may be heated to a temperature in excess of the fusion temperature of the resin, the fusion temperature of the resin being only the lower limit. When polystyrene beads are employed, it is found that a molding temperature in the range of from 68° to 125° C. is desirable. As the beads have been heated to a temperature close to their fusion temperature prior to introduction into the mold, little heat input is required to reach the desired molding temperature.

The heating of the bead-filled mold is conducted under a controlled pressure. This gas pressure must be great enough to equalize the vapor pressure of the blowing agent and thereby prevent further expansion of the individual beads at this step of the process. A pressure of from about 4 to 50 p.s.i. is usually satisfactory and pressure of from about 4 to 10 p.s.i. is quite adequate. In practice, this pressure can be supplied by any available gas. As compressed air is readily available and extremely inexpensive, it may be used for this purpose. Alternatively, the bead-filled mold may be heated by introducing steam under pressure into the mold. In this case, the steam serves as both the source of heat and the controlling pressure medium. When steam is used, it is best to have the steam at a temperature of from 100° to 150° C. and a pressure in the mold of from 5 to 30 p.s.i.

After the bead-filled mold has been heated under the controlled pressure for a time sufficient to bring the beads to the desired molding temperature, the pressure within the mold is suddenly and instantaneously released. This sudden release of pressure results in a sudden bead size growth caused by the pressure within the individual beads. This growth at or above surface fusion temperature results in a uniformly molded cellular article. Furthermore, the instantaneous expansion of the propellant within each individual bead results in a sudden temperature drop within the molded piece. This reduction in temperature is found to reduce materially or eliminate the need for a cooling cycle.

The pressure within the mold may be released by merely venting the mold to the atmosphere. Preferably, a vacuum source is employed to effectuate the sudden decompression within the mold. When a vacuum source is used, it is found desirable to employ a vacuum of from about 0.01 inch of mercury to 15 inches of mercury.

In most cases, the sudden expansion of the blowing agent will entirely eliminate the need for a cooling cycle. However, in some instances, a short cooling cycle is required. Should this be necessary, any conventional cooling method, such as pumping a heat-absorbing fluid through the mold or spraying the mold with a cooling liquid, may be employed. As the temperature of the molded piece has been materially reduced, this cooling cycle can be very short and therefore, will not substantially impede production as is the case with currently used cooling methods.

In practicing the method of this invention, it is not necessary to preheat the beads prior to introduceing them into the mold. It has been found, however, that the combination of the preheating step and the heating under controlled pressure results in a substantially shorter cooling cycle than when the preheating step is omitted.

The method of this invention may be employed to form cellular articles from any of the expandable thermoplastic resins in the prior art. Examples of suitable thermoplastic materials include the homopolymers and copolymers of polystyrene, the homopolymers and copolymers of alkyl or halo substituted polystyrene, and homopolymers and copolymers of various other synthetic resins, such as polyvinyl chloride, polyvinylidene chloride, polyacrylic esters, polymethacrylic esters, polyacrylonitrile, and polyolefins, such as polyethylene and polypropylene.

The blowing agents used to foam the expandable thermoplastic resinous materials, may be any of those which are known by the prior art to be suitable for this purpose. Thus, any heat-sensitive gas generating agent may be employed. This includes liquid blowing agents, such as petroleum ether, pentane, hexane, heptane, cyclopentane, cyclohexane and cyclopentadiene, or mixtures of these liquids. Furthermore, solid materials which decompose on heating to generate a gas may be used. These include such solid blowing agents as $\alpha,\alpha'$-azobisisobutyryl nitrate, $p,p'$-oxy-bis benzene sulfonyl hydrazide and sodium carbonate. The expandable synthetic resinous material is prepared with conventional quantities of the particular blowing agent used. The quantity depends upon the amount of the specific propellant substance that may be necessary for a given thermoplastic to accomplish efficient foaming action upon application of heat to the expandable mass. The blowing agents may be incorporated into the thermoplastic materials by techniques conventional in the art.

The thermoplastic beads, containing the blowing agent may be of any conventional size and shape. These beads generally have a diameter of from about 0.3 to 10 ml.

The method of this invention may be carried out in any suitable molding apparatus. An example of a suitable mold is shown in the accompanying drawing. As shown, a multiple part mold 10, having upper mold section 11 and lower mold section 12, can be employed. The expandable synthetic resin beads are introduced into mold cavity 13 through filling tube 19. The beads are heated to molding temperature by introducing a heated gas or steam into the mold 10 by way of inlets 16. The gas is maintained at a pressure which prevents expansion of the individual beads. It leaves the mold through outlets 18. Following completion of the heating step, the pressure within mold cavity 13 is substantially instantaneously reduced by immediately applying a vacuum to the mold. A source of vacuum (not shown) is attached to the mold at openings 15 and communicates with the mold cavity 13 through inlets 14. The reduction in pressure within mold cavity 13 causes the beads to expand and produce a molded cellular article. If a cooling step is necessary, this may be performed by spraying cooling water from jets 17 onto the surface of mold cavity 13.

Further illustration of this invention is provided by the following examples:

EXAMPLE I

Polystyrene beads, 0.5 mm. in diameter, and containing n-pentane as a blowing agent are introduced into a mold. The bead-filled mold is heated to a temperature of 110° C. During this heating, the beads are maintained under compressed air at a pressure of 10 pounds per square inch, which equalizes the vapor pressure of the blowing agent within the beads and prevents expansion of the individual beads. After heating in this manner for 0.1 minute, the pressure in the mold is suddenly released by discontinuing the flow of compressed air and immediately applying a vacuum of 5 inches of mercury to the mold. This substantially instantaneous decompression causes the m-pentane to rapidly expand and results in a cellular polystyrene article which may be then removed from the mold. The sudden expansion of the blowing agent reduced the temperature of the molded piece. No additional cooling step was required.

EXAMPLE II

About 0.1 pound of pre-expanded polystyrene beads, 1.0 mm. in diameter, and containing about 6% by weight of 25% isopentane and 75% n-pentane as a blowing agent, are heated to a temperature of 50° C. This causes the propellant to vaporize. The hot beads are then introduced into a mold having a volume of about 0.05 cu. ft. and heated to a temperature of 70° C. During this heating, the beads are maintained under compressed air at a pressure of 8 pounds per square inch, which equalizes the vapor pressure of the blowing agent within the beads and prevents further expansion of the individual beads. After heating in this manner for 0.2 minute, the pressure within the mold is suddenly released by discontinuing the flow of air and immediately applying a vacuum of 3 inches of mercury to the mold. This sudden decompression causes the blowing agent to expand rapidly and results in a cellular polystyrene article which may be then removed from the mold. As the sudden expansion of the blowing agent reduces the temperature of the polystyrene, it is found that no additional cooling step is required.

EXAMPLE III

About 0.1 pound of polystyrene beads, 1 mm. in diameter, and containing 5% by weight of petroleum ether as a blowing agent, are heated to a temperature of 60° C. This causes the petroleum ether to vaporize. The hot beads are then introduced into a mold having a volume of about .07 cu. ft. Steam at a temperature of 115° C. and a pressure of 10 pounds per square inch is then introduced into the mold and the beads are heated in this manner for 0.2 minute. The steam pressure is sufficiently high to equalize the vapor pressure of the blowing agent and prevent further expansion of the individual beads. The pressure within the mold is suddenly released by discontinuing the flow of steam and immediately applying a vacuum of 8 inches of mercury to the mold. This sudden decompression causes the blowing agent to expand rapidly and results in a cellular polystyrene article which may then be removed from the mold. As the sudden expansion of the blowing agent reduced the temperature of the polystyrene, it is found that no additional cooling step is required.

Thus, by employing the method of this invention, cellular articles can be regularly produced in a manner which does not require a lengthy and costly cooling step.

While there have been shown and described and pointed out the fundamental novel features of the invention as applied to the preferred embodiment, it will be understood that various omissions and substitutions and changes in the details of the process illustrated may be made by those skilled in the art without departing from the spirit of the invention. It is the intention, therefore, to be limited only as indicated by the scope of the following claim.

What is claimed is:

1. A method of molding cellular articles from thermoplastic synthetic resin beads containing a blowing agent wherein such beads are introduced into a closed mold and heat and pressure is applied to expand and fuse such beads into a cellular article which is then cooled before removal from the mold, the improvement comprising; initially heating the thermoplastic synthetic resin beads containing a blowing agent to a temperature higher than the vaporization temperature of said blowing agent and lower than the fusion temperature of said thermoplastic synthetic resin and causing said blowing agent to vaporize;

introducing the thus heated beads into a mold; heating the bead filled mold to a temperature of at least the fusion temperature of said thermoplastic synthetic resin while maintaining said beads under a pressure sufficient to prevent expansion of the individual beads; then suddenly releasing said pressure on said beads causing said beads to expand into a molded article with said rapid expansion cooling the same; and removing the thus formed cellular article from said mold.

References Cited

UNITED STATES PATENTS

| | | | |
|---|---|---|---|
| 2,221,727 | 11/1940 | Stenberg. | |
| 3,058,162 | 10/1962 | Grabowski | 264—53 |
| 3,065,500 | 11/1962 | Berner | 264—53 X |
| 3,086,248 | 4/1963 | Culp | 264—53 |
| 2,216,834 | 10/1940 | Buskirk | 264—55 X |
| 2,751,627 | 6/1956 | Lindemann | 264—55 X |
| 3,046,608 | 7/1962 | Grebby et al. | 264—53 |
| 3,129,464 | 4/1964 | Heider | 264—53 X |
| 3,162,704 | 12/1964 | Attanasio | 264—53 |
| 3,233,016 | 2/1966 | Kracht | 264—53 |
| 3,278,658 | 10/1966 | Immel | 264—51 |

PHILIP E. ANDERSON, *Primary Examiner.*

U.S. Cl. X.R.

18—5; 264—88, 102, 237